(No Model.)

E. SHMITZ.
PULLEY.

No. 597,531. Patented Jan. 18, 1898.

Witnesses:
E. B. Bolton

Inventor:
Edmund Shmitz
By
his Attorneys.

THE NORRIS PETERS CO., PHOTO-LITHO., WASHINGTON, D. C.

UNITED STATES PATENT OFFICE.

EDMUND SHMITZ, OF MÜNCHEN-GLADBACH, GERMANY.

PULLEY.

SPECIFICATION forming part of Letters Patent No. 597,531, dated January 18, 1898.

Application filed August 24, 1897. Serial No. 649,385. (No model.)

*To all whom it may concern:*

Be it known that I, EDMUND SHMITZ, manufacturer, residing at 25 Schogenstrasse, München-Gladbach, in the Empire of Germany, have invented Improvements in Pulleys; and I do hereby declare the nature of this invention and in what manner the same is to be performed to be particularly described and ascertained in and by the following statement.

My invention has reference to pulleys for use in transmitting motion by belting or for other similar purposes, and has for its object to produce a pulley having the qualities of strength and economy in production.

My invention consists in a pulley made as hereinafter described.

The accompanying drawings illustrate the application of the invention, in which—

Figure 1:
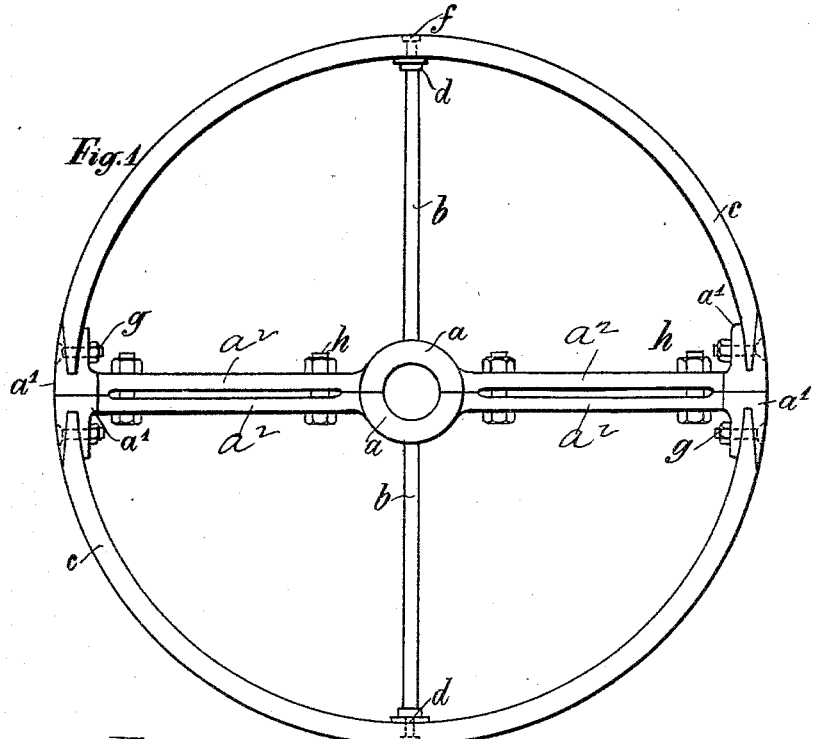
Figure 2:
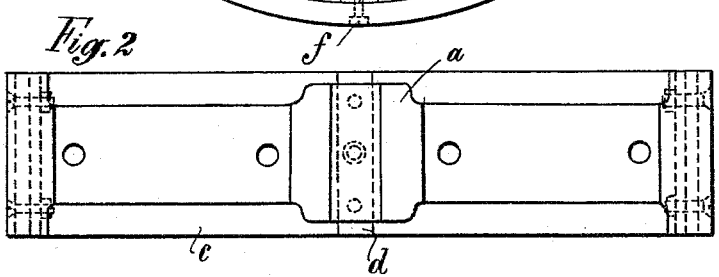
Figure 3:
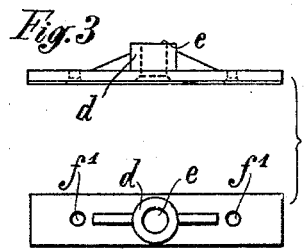
Figure 4:
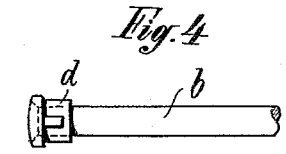

Figures 1 and 2 are an elevation and part plan, respectively, of a small pulley made in accordance with this invention. Figs. 3 and 4 show details upon a larger scale.

In carrying the invention into effect as illustrated in the drawings the pulley is constructed in such a manner that the boss $a$ and spokes $b$ are made of iron, while the rim $c$ is provided from wood curved to a proper circular form. The connection between the spokes and the rim is effected by cross-pieces $d$, (represented in detail elevation and plan in Fig. 3,) having a boss $e$, into which the extremity of the spoke $d$ is forced, the connection being completed by means of countersunk screws $f$ within holes $f'$, as illustrated.

It is obvious that the boss may be made of either wrought or cast iron, and in the case of larger pulleys, which are cast, supplementary spoke-rods are cast in the boss, having their outer extremities at a determinate distance from the center to hold the rim in a circular position.

The boss $a$ is formed in two equal segmental parts which have radial extensions $a^2$ on each side, so that upon the parts of the boss being placed together the radial extensions fall one upon the other and form the main spokes, which serve, by means of bracket-pieces $a'$ at their extremities, to retain the extremities of the segmental circularly-curved wood rim $c$. The radial extensions forming the spokes are bolted together by means of the bolts $h$, as illustrated, and firmly hold the extremities of the wood rim $c$ in the V-shaped recesses in the ends of the bracket-pieces $a'$, the connection being firmly and positively made by means of bolts $g$, as illustrated. For similar pulleys the boss $a$ and its extensions are made of malleable iron, and for light pulleys tubes are used instead of bar-iron for the main and supplementary spokes. The bracket-pieces $a'$ are preferably formed integral with the extensions $a^2$.

Having now particularly described and ascertained the nature of my said invention and in what manner the same is to be performed, I declare that what I claim is—

1. A pulley comprising the sectional boss $a$, each section having extensions $a^2$ with a recessed bracket-piece $a'$ at each end, the ends of the rim-sections fitting in said recesses, bolts for holding the extensions together and bolts for holding the rim-sections in the recesses of the bracket.

2. In combination the sectional boss $a$ having the extensions $a^2$ with means for securing them together, the recessed bracket-pieces $a'$ at the ends of the extensions, the rim-sections having their ends secured in the said recesses, and the spokes $b$ each with the socketed cross-piece $d$ secured to the rim, substantially as described.

In witness whereof I have hereunto set my hand in presence of two witnesses.

EDMUND SHMITZ.

Witnesses:
   WILLIAM ESSENWEIN,
   ERNEST ANDRÉ.